Figure 1:
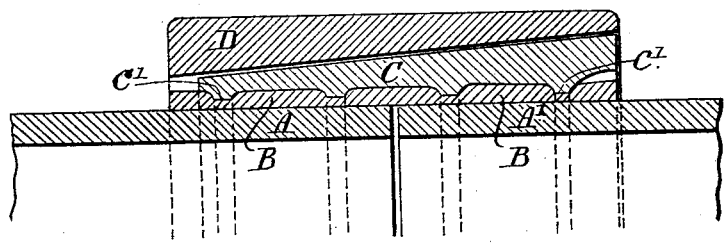
Figure 2:
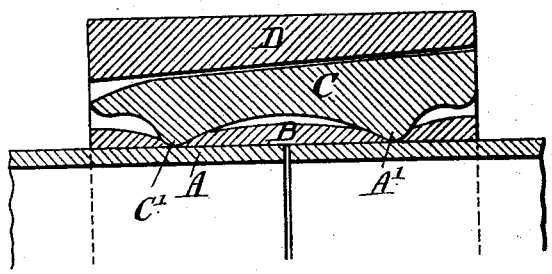

(No Model.) 7 Sheets—Sheet 1.

D. J. R. DUNCAN.
MEANS FOR JOINTING MAINS, PIPES, &c.

No. 591,828. Patented Oct. 19, 1897.

(No Model.) 7 Sheets—Sheet 2.

D. J. R. DUNCAN.
MEANS FOR JOINTING MAINS, PIPES, &c.

No. 591,828. Patented Oct. 19, 1897.

Witnesses:
Thomas Durant
J. V. B. Peyton Jr.

Inventor:
David J. R. Duncan,
by
Church & Church
his Attys.

(No Model.) 7 Sheets—Sheet 3.
D. J. R. DUNCAN.
MEANS FOR JOINTING MAINS, PIPES, &c.

No. 591,828. Patented Oct. 19, 1897.

(No Model.) 7 Sheets—Sheet 4.
D. J. R. DUNCAN.
MEANS FOR JOINTING MAINS, PIPES, &c.
No. 591,828. Patented Oct. 19, 1897.
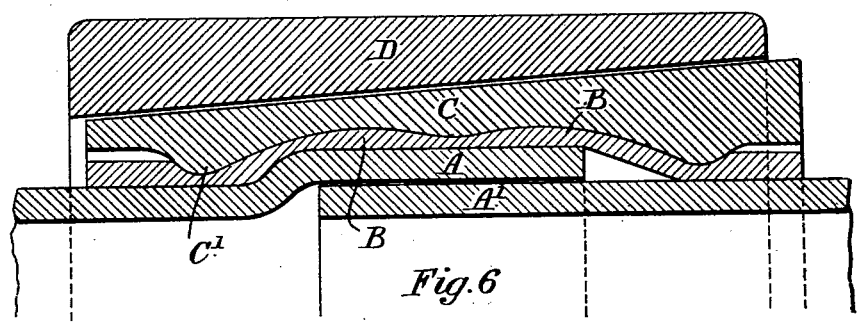
Fig. 6
Fig. 7.
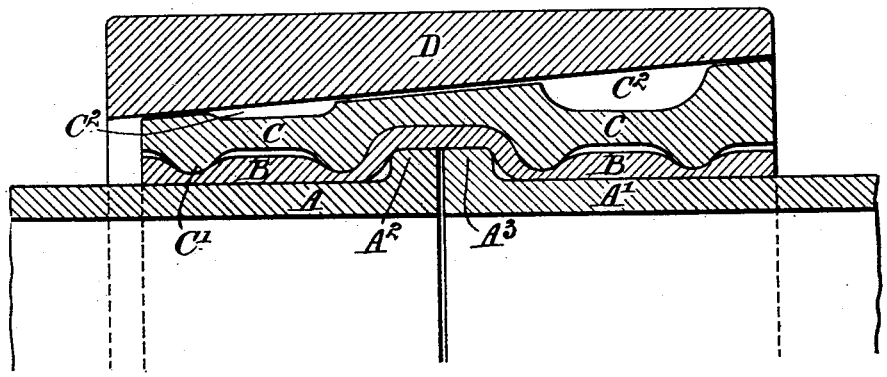
Witnesses:
Inventor:
David J. R. Duncan
his Attys.

(No Model.) 7 Sheets—Sheet 5.

D. J. R. DUNCAN.
MEANS FOR JOINTING MAINS, PIPES, &c.

No. 591,828. Patented Oct. 19, 1897.

Witnesses
Thomas Durant
J B Peyton Jr

Inventor:
David J. R. Duncan,
by Church & Church
his Attys.

(No Model.) 7 Sheets—Sheet 6.

D. J. R. DUNCAN.
MEANS FOR JOINTING MAINS, PIPES, &c.

No. 591,828. Patented Oct. 19, 1897.

Witnesses:
Thomas Durant
J. B. Peyton, Jr.

Inventor:
David J. R. Duncan,
by Church & Church
his Attys.

(No Model.) 7 Sheets—Sheet 7.

D. J. R. DUNCAN.
MEANS FOR JOINTING MAINS, PIPES, &c.

No. 591,828. Patented Oct. 19, 1897.

Witnesses:
Thomas Durant
J. B. Peyton Jr.

Inventor:
David J. R. Duncan
Church & Church
his attys

UNITED STATES PATENT OFFICE.

DAVID JOHN RUSSELL DUNCAN, OF LONDON, ENGLAND.

MEANS FOR JOINTING MAINS, PIPES, &c.

SPECIFICATION forming part of Letters Patent No. 591,828, dated October 19, 1897.

Application filed April 19, 1897. Serial No. 632,848. (No model.)

*To all whom it may concern:*

Be it known that I, DAVID JOHN RUSSELL DUNCAN, a subject of the Queen of England, residing at Westminster, London, in England, have invented certain new and useful Improvements in the Means for Jointing Mains, Pipes, and other Conduits for Water, Gas, and other Fluids and Vapors, of which the following is a specification.

This invention relates to the jointing of steel, iron, and other pipes, particularly water and gas mains of large diameter. The pipes to be jointed together may be in any lengths, and their ends may be either plain, so as to simply butt together, or the end of one pipe may be enlarged, so that the ends overlap, or the ends may be provided with bands, hoops, ridges or grooves either cast, cut, shrunk or otherwise formed on or attached to them.

In carrying out this invention I employ a device consisting of two or more parts—viz., first, a packing-strip; second, a circumferential tapering wedge, and, third, a sleeve or compression-ring.

The invention will be best understood by reference to the accompanying drawings, Figures 1 to 11, all of which (except Fig. 11) show in sections, taken parallel with the axis of the pipes, various forms of my jointing device, the sections being taken through one side only of the pipes.

In all the drawings, A and A' are the pipes; B, the packing-strip; C, the taper-wedge, and D the compression-ring.

First. The packing-strip B, formed of any suitable compressible material—such, for example, as lead or india-rubber—is laid circumferentially round the joint of the pipes. It may be of any width considered desirable, and of rectangular, curvilinear, corrugated or other section, and its edges or ends may overlap or may butt together, either parallel with or diagonal to the axis of the pipes. It may be in one or more pieces, and though generally a loose piece it may, if preferred, be fastened either to the taper-wedge, which is placed over it, or to one of the pipe ends, or it may be run into place after the pipes are put together.

Second. The taper-wedge C consists of a band or ring, preferably of steel or other metal, formed in one piece, in which case it is split, as shown at K, Fig. 11, or of two or more segments, which may have the ends or edges butting or overlapping, parallel with or diagonal to the axis of the pipes. Packing may be used at the divisions to make them tight, if necessary. The wedge may be of any desired length or thickness and may be plane or may have ribs or grooved recesses internally or externally, or both. Internally it is usually of equal diameter at both ends, but it may be formed with a taper, as shown, for example, in Fig. 5. Externally it is conical or tapering, thus forming a circumferentially-tapering compressible wedge or ring, which contracts in diameter under the pressure of the compression-ring or sleeve D, which is forced over it in making the joint.

Figure 3:
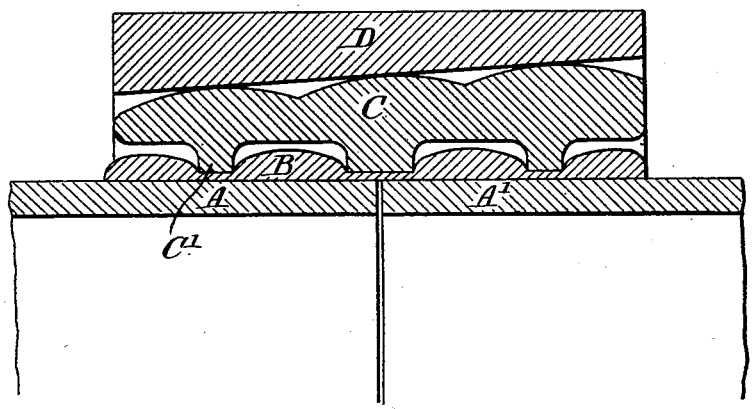
Figure 4:
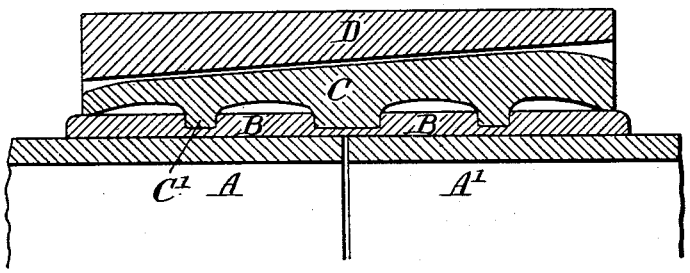

Third. The compression-ring D consists of a rigid hoop or sleeve, preferably of steel or other metal, of any suitable length or thickness, having its inner surface tapered to correspond with the external taper of the wedge C. The inner surface of D may be grooved or recessed to reduce the area of its bearing-surfaces on the outside of C, as shown in Fig. 3. The joint is made by forcing the compression-ring D over the split wedge C, thus contracting it, and compressing the packing-strip B around the ends of the pipes A A'. Conversely the joint may be loosened or taken apart by withdrawing the compression-ring D. Any suitable means may be employed for forcing the compression-ring upon the wedge—such, for example, as hammering it on, or using screw, hydraulic, or other power. Clamps or bands may be used, placed temporarily round the pipes, and drawn together by screw-bolts. Two or more hydraulic presses suitably mounted in a suspended cradle may be employed for closing the joint. After the joint has been made, the packing-strip may, if desired, be calked into an annular space between the pipes and the ends of the taper-wedge.

Figure 5:
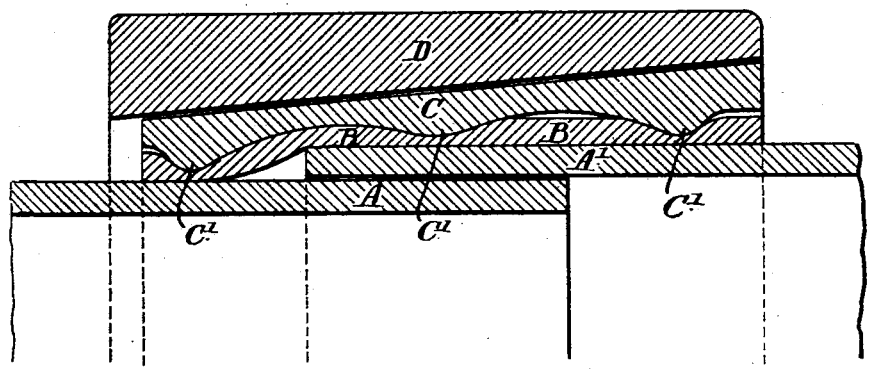
Figure 8:
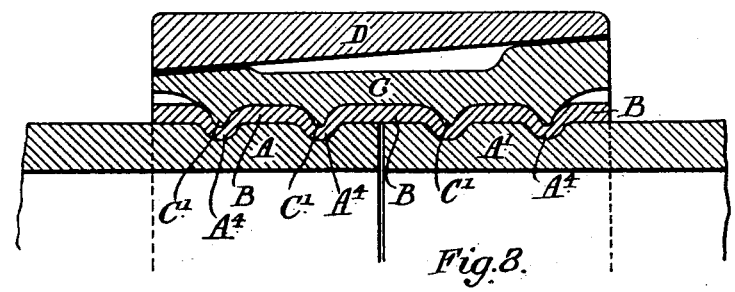
Figure 9:
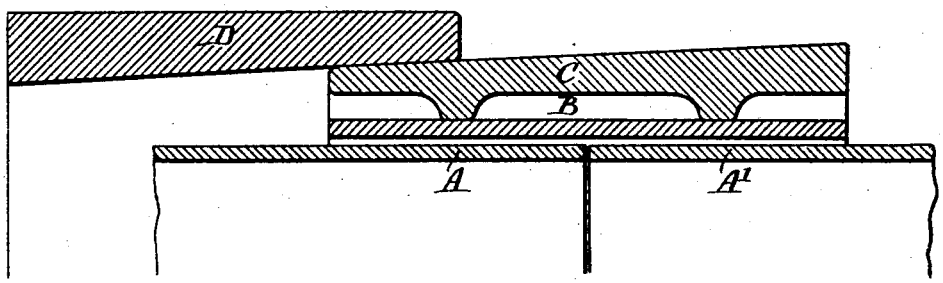
Figure 10:
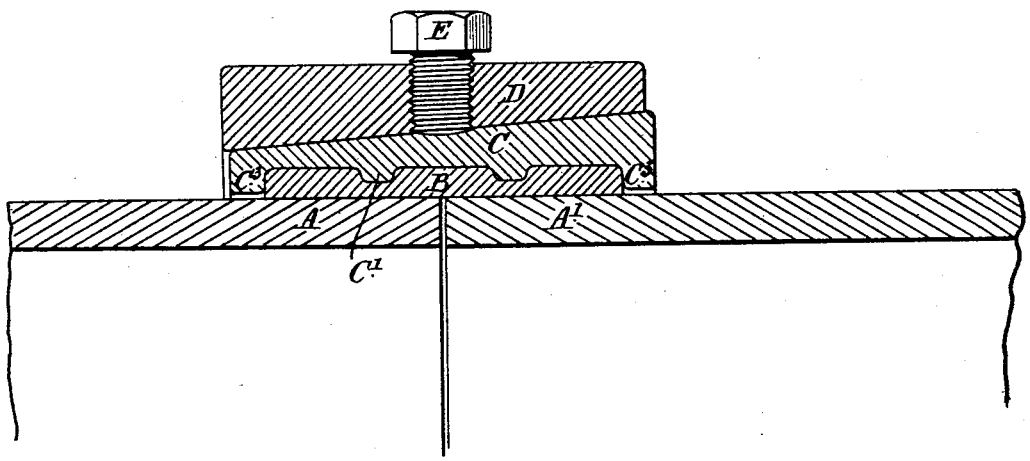
Figure 11:
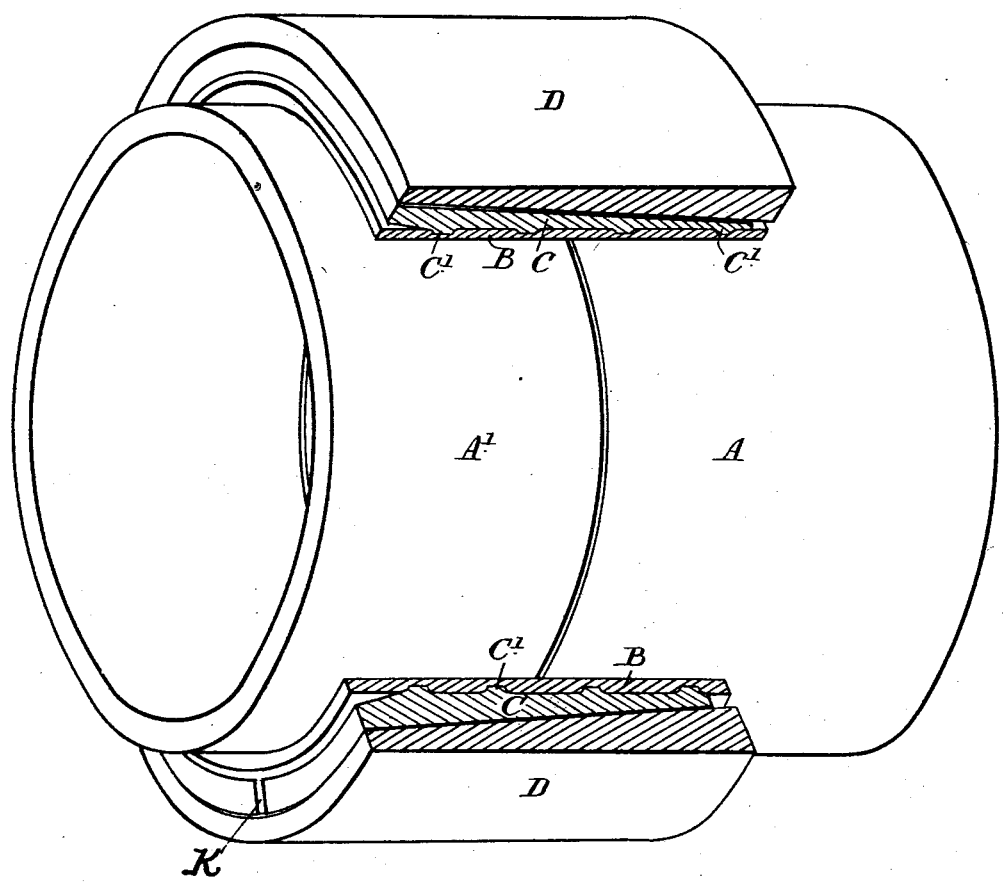

Referring to the accompanying drawings, Fig. 1 shows a joint in which the ends of the pipes are butted one against the other. The wedge C is provided with four projections C' internally, so as to put pressure on the packing-strip B at those points. Figs. 2, 3, 4, 8, 9, 10, and 11 represent similar buttjoints in which modifications are shown in the shape of the wedge C. Fig. 5 shows a joint formed by two pipes of unequal size, so that one pipe A' overlaps the other, A. The wedge C is tapered internally as well as externally and puts pressure on the packing-strip B with curved projections C'. Fig. 6 shows a form of overlapping joint in which the end of the pipe A is enlarged. Fig. 7 shows a joint where the pipes A A' are provided with hoops or flanges $A^2$ $A^3$, and the wedge C is recessed or provided with grooves $C^2$ externally. Fig. 8 shows a joint in which the pipes A A' have grooves $A^4$ round them, near their ends, the wedge C being provided with projections C', so as to press the packing-strip B into the grooves. Fig. 9 shows a joint with the compression-ring D, wedge C, and packing-strip B in position ready to make the joint, which is completed by forcing the ring D upon the wedge C in the direction of the arrow as far as may be necessary. Fig. 10 shows a joint in which the wedge C is provided with a projection $C^3$ at each end, so constructed as to confine the packing-strip B between them. The compression-ring D is shown with a set-screw E locking it with wedge C. One or more set-screws may be used. Fig. 11 is a perspective view, partly broken away, of the joint shown in Fig. 1.

It is evident that many modifications may be made without departing from the spirit of this invention, and in carrying it out I do not confine myself to the forms and details shown in the drawings accompanying this specification. For instance, although I prefer to use the packing b, I may dispense with that by turning the pipe ends and interior of the wedge so that they are true fits, or the ring C may be made of soft metal, which when compressed upon the pipes will make a tight joint without separate packing.

I claim—

1. In a pipe-joint, the combination with a rigid sleeve or compression-ring, having a tapered inner surface, of a correspondingly circumferentially tapered contractible wedge of hard metal as steel, and a packing-strip; substantially as described.

2. In a pipe-joint, the combination with a rigid sleeve or compression-ring having a tapered inner surface, of a correspondingly circumferentially tapered split ring or wedge of hard metal as steel; and a packing-strip.

3. In a pipe-joint the combination of a rigid sleeve or compression-ring and a circumferentially-tapered contractible wedge having a packing-strip attached to it and all forming parts of the permanent joint substantially as described.

4. In a pipe-joint, the combination with a sleeve or compression-ring of a circumferentially-tapered wedge having projections on its inner surface and a packing-strip; substantially as described.

5. In a pipe coupling or joint, the combination with the sleeve or compression-ring having a tapered inner surface, of a correspondingly circumferentially tapered wedge, the contacting face of one of these members being recessed to reduce friction; substantially as described.

In testimony whereof I have hereto set my hand in the presence of the two subscribing witnesses.

DAVID JOHN RUSSELL DUNCAN.

Witnesses:
ALFRED J. BOULT,
HARRY B. BRIDGE.